J. M. Evarts.
Cutting Screws.
Nº 17,563.  Patented Jun. 16, 1857.
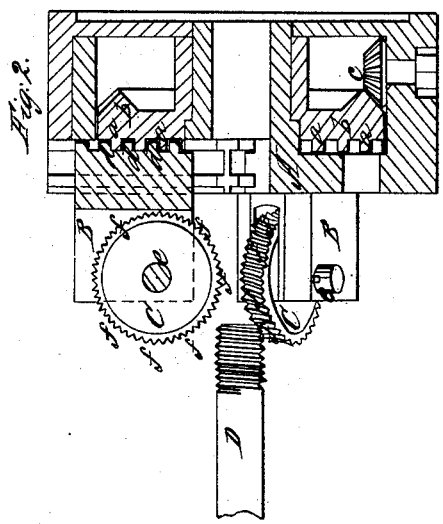
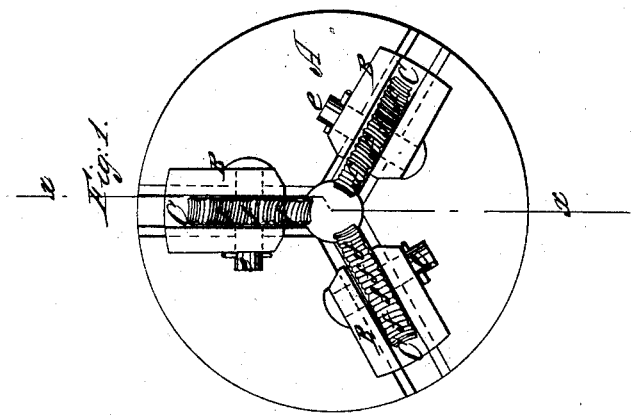

UNITED STATES PATENT OFFICE.

JAMES M. EVARTS, OF WESTVILLE, CONNECTICUT.

SCREW-CUTTER.

Specification of Letters Patent No. 17,563, dated June 16, 1857.

*To all whom it may concern:*

Be it known that I, JAMES M. EVARTS, of Westville, in the county of New Haven and State of Connecticut, have invented a new and Improved Implement or Device for Cutting Screws; and I do hereby declare that the following is a full, clear, and exact description of the same, reference being had to the annexed drawings, making a part of this specification, in which—

Figure 1 is a front or face view of my improvement. Fig. 2 is a section of same taken in the line $(x)$ $(x)$, Fig. 1.

Similar letters of reference indicate corresponding parts in the two figures.

This invention consists in the employment or use of rotating dies placed in a concentric chuck and arranged as will be hereinafter fully shown and described whereby a very durable device is obtained and one by which screws may be cut rapidly and in a perfect manner.

To enable those skilled in the art to fully understand and construct my invention, I will proceed to describe it.

A, represents a concentric chuck in which three sliding sockets or plates B, are fitted. These plates are fitted in the chuck in the same manner as the usual jaws. The sockets or plates B, are operated, that is, made to approach and recede from each other, by a coiled projection $(a)$, on a plate or disk $(b)$, which is rotated by a pinion $(c)$. The coiled projection $(a)$ fits in grooves $(d)$ made in the inner ends of the sockets or plates.

The parts above named with the exception of the plates or sockets form no part of the invention, as it is a well known chuck and in quite common use.

Within each socket or plate B, a wheel C, is placed. These wheels are constructed of cast steel and are allowed to rotate freely on shafts $(e)$, which pass transversely through the sockets or plates. The peripheries of the wheels C, are of concave form, and have V-shaped grooves $(f)$ cut in them, which grooves are a trifle out of parallel with the shafts $(e)$. The peripheries of the wheels at their edges are beveled or inclined a trifle. The grooves $(f)$ form cutters quite similar so far as the cutting operation is concerned to the ordinary dies now used for cutting screws, but the ordinary grooves are cut in stationary plates. The wheels C, are all equal in diameter and are placed at equal distances from the center of the chuck.

The operation is as follows: The chuck is attached to a mandrel and is made to rotate, the rod on which the screw is cut being stationary. The wheels C, are adjusted the required distance apart by turning the pinion $(c)$ by means of a wrench, and as the chuck A, rotates the rod D, shown in red Fig. 2 is passed between the wheels C, the cutter formed by the grooves $(f)$ cutting the thread in the rod. As the rod is fed between the wheels, the wheels rotate slowly so that fresh cutters are continually presented to the rod. The wheels C, therefore are rotary dies and are far more durable than the ones ordinarily used because such a large number of cutters may be employed to act successively on the rod, for instance, if the wheels C, are one inch and a half in diameter a length of four and a half inches of cutters is obtained on each wheel. Again when the cutters are worn dull at one side, the wheels may be reversed on their shafts or axes, and the dies will consequently last a long time.

The superiority of this invention over the usual screw cutting dies is obvious. The ordinary dies soon become worthless by use, even when formed of the best and properly tempered steel, for the rods are covered with a scale formed by oxidation and the scale is very hard and soon destroys the cutters, consequently these cutters or dies require to be frequently removed, and the operation of screw cutters is much delayed thereby. My improvement has been practically tested and the rotary dies have been found to last a very long time and a very large number of screws may be cut before the dies require to be changed. The improvement not only economizes as far as the cost of the dies is concerned, but also economizes in the saving of time hitherto expended in adjusting new dies in the stock. Also by this improvement a reverse movement of the chuck is not required. When the screw is cut, it may be immediately withdrawn without stopping the chuck, which may have a continuous rotary motion. The ordinary screw cutting devices require to have the motion reversed, either the dies or the screw; or the dies require to be opened, in order that the screw may be passed out from the dies. This consumes considerable time, which is saved by my improvement.

I do not claim the chuck for adjusting the dies nearer to or farther from each other, for that is a well known device; but,

Having thus described my invention, what I claim as new, and desire to secure by Letters Patent, is:

The rotary dies C, placed within sliding or adjustable plates or sockets B, attached to the chuck A, or an equivalent device, for the purpose set forth.

JAMES M. EVARTS.

Witnesses:
W. TUSCH,
J. W. COOMBS.